United States Patent
Sudo et al.

(10) Patent No.: US 8,474,981 B2
(45) Date of Patent: Jul. 2, 2013

(54) ILLUMINATION OPTICAL SYSTEM HAVING A LIGHT COMBINING PORTION THAT COMBINES LIGHT BEAMS FROM A PLURALITY OF LAMP UNITS AND PROJECTION DISPLAY APPARATUS

(75) Inventors: Takashi Sudo, Utsunomiya (JP); Hiroyuki Kodama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 209 days.

(21) Appl. No.: 12/970,665

(22) Filed: Dec. 16, 2010

(65) Prior Publication Data

US 2011/0149250 A1   Jun. 23, 2011

(30) Foreign Application Priority Data

Dec. 21, 2009   (JP) .................. 2009-288813

(51) Int. Cl.
  *G03B 21/26*   (2006.01)
(52) U.S. Cl.
  USPC ........................................... 353/37
(58) Field of Classification Search
  USPC ............ 353/20, 94, 98, 37; 362/234; 359/839
  See application file for complete search history.

(56) References Cited

U.S. PATENT DOCUMENTS

| | | | |
|---|---|---|---|
| 6,488,379 B2 | 12/2002 | Kane | |
| 2002/0176255 A1* | 11/2002 | Yamauchi et al. | 362/299 |
| 2003/0058411 A1* | 3/2003 | Katsumata et al. | 353/31 |
| 2007/0201229 A1* | 8/2007 | Yamada et al. | 362/263 |
| 2008/0218704 A1* | 9/2008 | Yagyu | 353/98 |

FOREIGN PATENT DOCUMENTS

JP    2004-524851 T    8/2004

\* cited by examiner

*Primary Examiner* — Thanh Luu
*Assistant Examiner* — Danell L Owens
(74) *Attorney, Agent, or Firm* — Canon U.S.A., Inc. IP Division (57) ABSTRACT

An illumination optical system includes first and second lamp units, a light combining portion that combines a light beam from the first lamp unit and a light beam from the second lamp unit, at least one light returning portion disposed between the first lamp unit and the light combining portion, or between the second lamp unit and the light combining portion, or both, the or each of the at least one light returning portion dividing a part of light emitted from the corresponding lamp unit into a light beam to be returned to the lamp and a light beam to be led to the light combining portion, and a condenser lens that condenses light from the light combining portion.

10 Claims, 13 Drawing Sheets

FIG. 12

ILLUMINATION OPTICAL SYSTEM HAVING A LIGHT COMBINING PORTION THAT COMBINES LIGHT BEAMS FROM A PLURALITY OF LAMP UNITS AND PROJECTION DISPLAY APPARATUS

BACKGROUND OF THE INVENTION

1. Field of the Invention

The present invention relates to an illumination optical system, and more specifically, it relates to an illumination optical system that illuminates a surface to be illuminated using a plurality of lamp units.

2. Description of the Related Art

Some of illumination optical systems employed in a current projection display apparatus illuminate a surface to be illuminated using a plurality of lamp units in order to illuminate it more brightly. In such a projection display apparatus, a technique is used that combines light beams emitted from a plurality of lamp units in order to reduce the light beam diameter. The light quantity distribution of light emitted from a general lamp unit is not uniform. Therefore, when combining light beams emitted from a plurality of lamp units, it is important to reduce illuminance unevenness.

PCT Japanese Translation Patent Publication No. 2004-524581 (corresponding to U.S. Pat. No. 6,488,379 B2) discloses a technique for equalizing the intensity distribution of combined light emitted from two lamp units. Specifically, lamps and a mirror are disposed such that the central part of light emitted from the larger lamp unit, where the intensity distribution is low, is supplemented with light emitted from the smaller lamp unit.

However, in the technique disclosed in PCT Japanese Translation Patent Publication No. 2004-524581, the smaller lamp unit uses only a region of the reflector near the optical axis, and therefore the parallelism of emitted light is not good. The reason is that the parallelism of light reflected by a region of the reflector near the optical axis is lower than that of light reflected by the periphery of the reflector. If the parallelism is low, the quantity of light blocked by the downstream optical system increases, and therefore the quantity of light usable for illumination decreases.

SUMMARY OF THE INVENTION

The present invention provides an illumination optical system and a projection display apparatus in which the use efficiency of light emitted from a plurality of lamp units is improved and the light of lamps can be effectively used.

In an aspect of the present invention, an illumination optical system includes first and second lamp units each including a lamp and a concave mirror, the lamp having an anode and a cathode arranged along the optical axis of the concave mirror, a light combining portion that combines a light beam from the first lamp unit and a light beam from the second lamp unit, at least one light returning portion disposed between the first lamp unit and the light combining portion, or between the second lamp unit and the light combining portion, or both, the or each of the at least one light returning portion dividing a part of light emitted from the corresponding lamp unit into a light beam to be returned to the lamp and a light beam to be led to the light combining portion, and a condenser lens that condenses light from the light combining portion. The light combining portion includes a first reflecting portion located on the optical axis of the first lamp unit and off the optical axis of the second lamp unit and a second reflecting portion located off the optical axis of the first lamp unit. The light combining portion combines the light beams from the lamp units by reflecting light emitted from a part of the second lamp unit off the optical axis of the second lamp unit with the first and second reflecting portions.

Further features of the present invention will become apparent from the following description of exemplary embodiments with reference to the attached drawings.

DESCRIPTION OF THE EMBODIMENTS

First Embodiment

Figure 1:
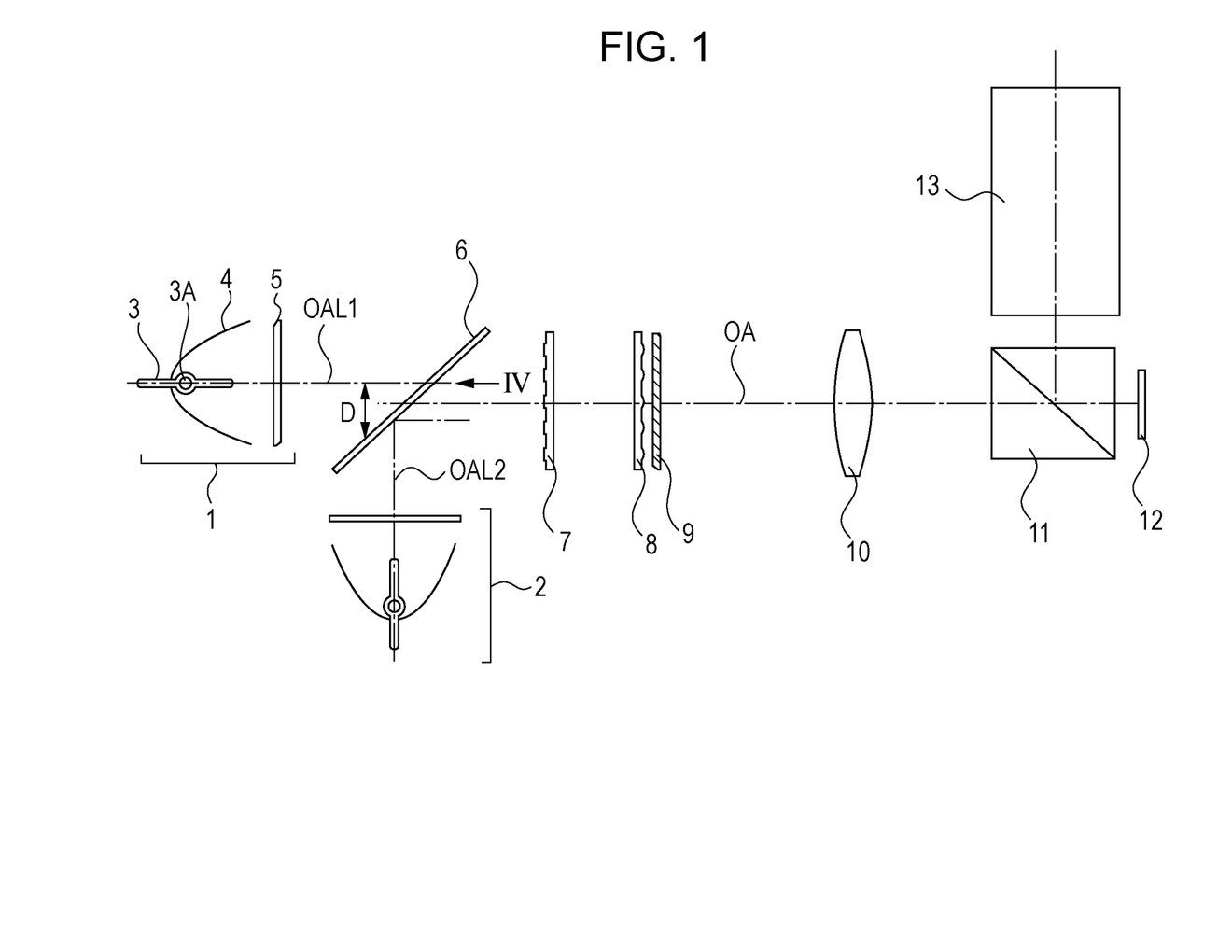
FIG. 1 is a schematic configuration diagram of a first embodiment.

FIG. 1 is a schematic configuration diagram of a first embodiment of a projection display apparatus of the present invention. Reference numeral 1 denotes a first lamp unit. The first lamp unit 1 has a light emitting portion 3A, a light emitting tube 3, and a parabolic mirror (concave mirror) 4. The light emitting portion 3A is located between a cathode and an anode. The light emitting tube 3 has the light emitting portion 3A therein. The parabolic mirror 4 reflects light from the light emitting portion 3A in a specific direction. Reference numeral 5 denotes a partial reflection glass plate (light returning portion) that has a reflective coating on some regions thereof. The partial reflection glass plate 5 is provided integrally with the first lamp unit 1. The light emitting portion 3A and the light emitting tube 3 are light sources that emit light in the visible wavelength range. The anode and cathode inside the light emitting tube 3 are arranged along the optical axis of the parabolic mirror 4. The light emitting portion 3A is disposed near the focal point of the parabolic mirror 4. In this specification, the light emitting portion 3A and the light emitting tube 3 will be collectively referred to as lamp. The focal length of the parabolic mirror 4 is denoted by f (f>0). Another lamp unit (second lamp unit) 2 also has a lamp, a parabolic mirror, and a partial reflection glass plate. Reference numeral 6 denotes a combining mirror that combines light beams emitted from the first lamp unit 1 and the second lamp unit 2. The arc length of the lamps in this embodiment is 1.0 mm.

The line OAL1 shows the optical axis of the first lamp unit 1. The line OAL2 shows the optical axis of the second lamp unit 2. Reference letter D denotes the distance between the optical axis OAL1 of the first lamp unit 1 and the optical axis OAL2 of the second lamp unit 2. In other words, D is the distance between the optical axes of the lamp units as viewed from the light emitted from one of the lamp units (here the second lamp unit 2) and reflected by the combining mirror 6, or the distance between the optical axes of the lamp units as viewed from the light emitted from the other lamp unit (here the first lamp unit 1) and transmitted by the combining mirror 6. The first lamp unit 1 is disposed such that the optical axis OAL1 is at an angle of about 45 degrees to the combining mirror 6. The second lamp unit 2 is disposed such that the optical axis OAL2 of the second lamp unit 2 is at an angle of about 45 degrees to the combining mirror 6. The combining mirror 6 and the lamp units are disposed such that the distance D between the optical axis OAL1 of the first lamp unit 1 and the optical axis OAL2 of the second lamp unit 2 satisfies $0<D<4f$.

Reference numeral 7 denotes a first fly eye lens. Reference numeral 8 denotes a second fly eye lens. Reference numeral 9 denotes a polarization conversion element that converts unpolarized light into linearly polarized light. Reference numeral 10 denotes a condenser lens. The first fly eye lens 7 and the second fly eye lens 8 are each a two-dimensional lens array. The partial reflection glass plate 5, the combining mirror 6, the first fly eye lens 7, the second fly eye lens 8, the polarization conversion element 9, and the condenser lens 10 will be collectively referred to as illumination optical system. Reference letter OA denotes the optical axis of the illumination optical system. Reference numeral 11 denotes a polarization beam splitter. Reference numeral 12 denotes a liquid crystal display element (image modulation element). Reference numeral 13 denotes a projection lens (projection optical system). The terms "P-polarized light" and "S-polarized light" used in the following description are defined relative to the plane of incidence of the polarization beam splitter 11.

The combined light after exiting the combining mirror 6 will be described. The combined light after exiting the combining mirror 6 is divided and condensed by the first fly eye lens 7, and each divided light beam is condensed to the vicinity of the second fly eye lens 8. The divided light beams after being condensed to the vicinity of the second fly eye lens 8 are incident on the polarization conversion element 9 and are each converted into linearly polarized light. The divided light beams after being converted into linearly polarized light by the polarization conversion element 9 are condensed by the condenser lens 10, pass through the polarization beam splitter 11, and illuminate the liquid crystal display element 12. In the case of all white display, P-polarized light incident on the liquid crystal display element 12 is modulated into S-polarized light, and the modulated S-polarized light is reflected by the polarization splitting surface of the polarization beam splitter 11. The reflected light is incident on the projection lens 13, and an image is enlarged and projected onto a projection surface, such as a screen. In the case of all black display, P-polarized light incident on the liquid crystal display element 12 is reflected without being modulated, and the reflected light passes through the polarization splitting surface of the polarization beam splitter 11 and is returned to the light source. The above-described illumination optical system performs Köhler illumination. The light emitting portion 3A and the second fly eye lens 8 are disposed at positions conjugate to each other. The first fly eye lens 7 and the liquid crystal display element 12 are also disposed at positions conjugate to each other.

Figure 2:
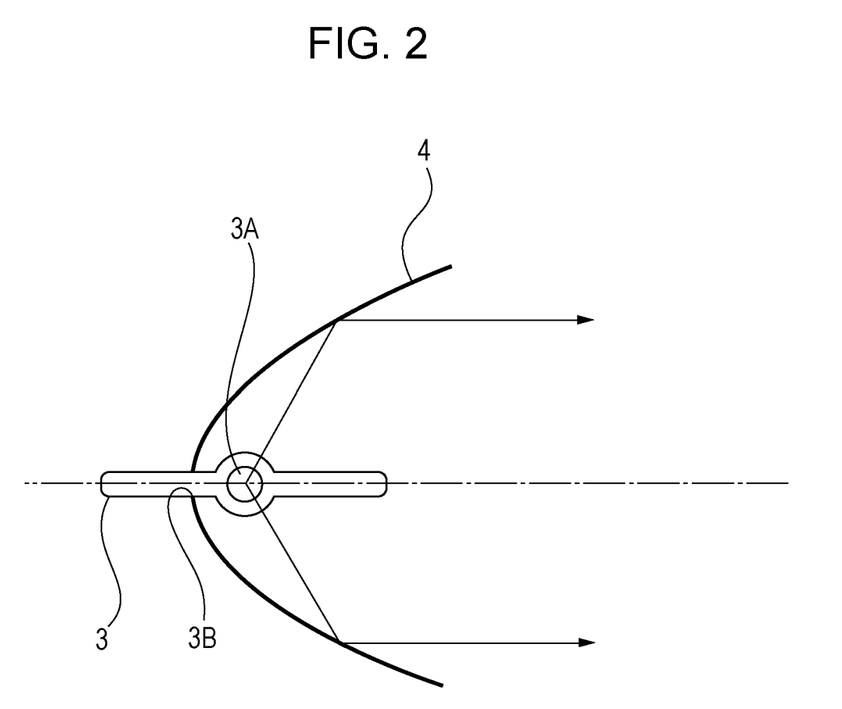
FIG. 2 illustrates light emitted from a lamp unit.

FIG. 2 is an enlarged view of the first lamp unit 1. Because the light emitting tube 3, the light emitting portion 3A, and the parabolic mirror 4 have been already described, the description thereof will be omitted. Reference numeral 3B denotes a hole that is formed at the root of the parabolic mirror 4 in order to hold the light emitting tube 3. The hole 3B will hereinafter be referred to as root opening. Due to this root opening 3B, the illuminance distribution in the opening plane on the emitting side of the lamp unit is concentric. The illuminance distribution and light quantity distribution in the opening plane of the lamp unit will be described with reference to FIGS. 3A to 3B.

Figure 3A:
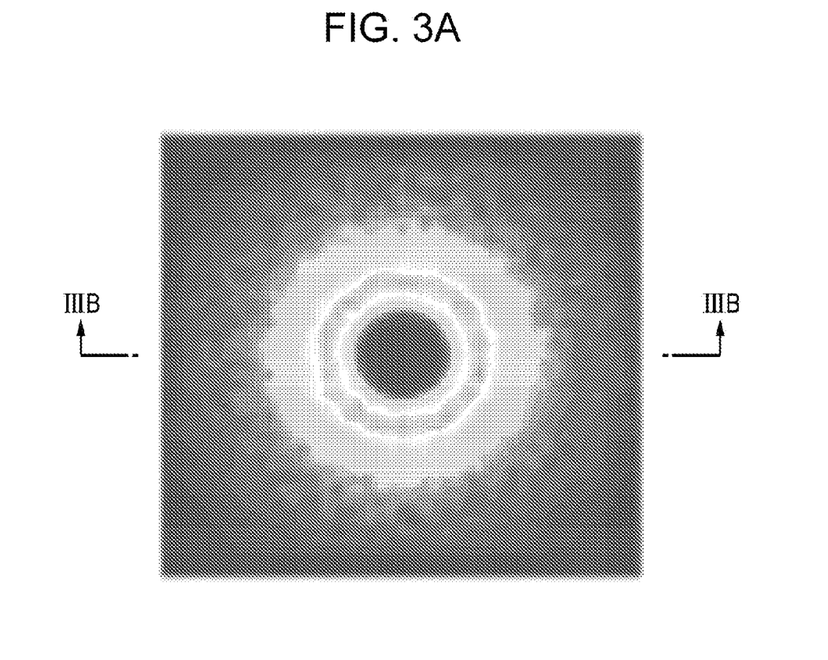
FIGS. 3A and 3B show the intensity distribution of light emitted from the lamp unit.

FIG. 3A is a grayscale image showing the illuminance distribution in the opening plane of the lamp unit. From FIG. 3A, it can be seen that the illuminance distribution of light emitted from the lamp unit is annular distribution. The brightest part is located at a distance of 2f from the center.

Figure 3B:
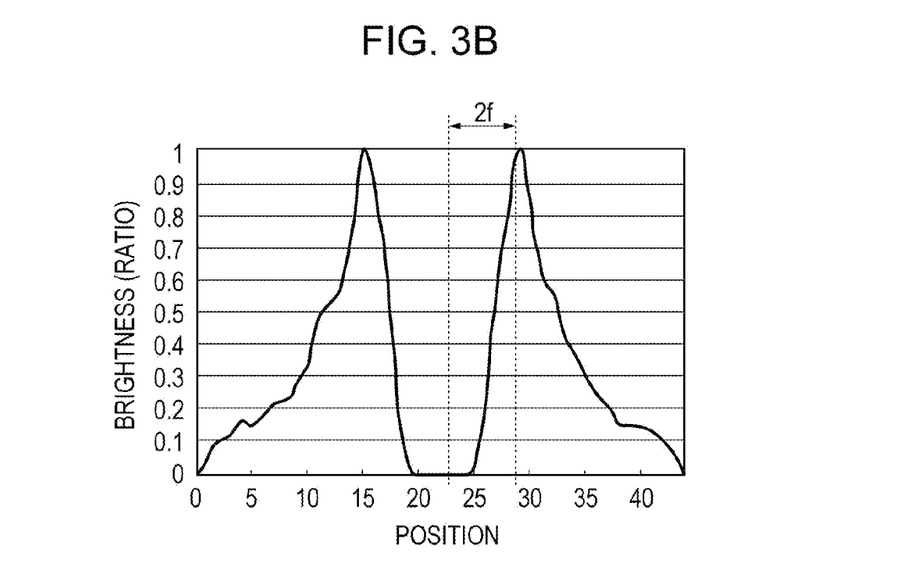

FIG. 3B shows the light quantity distribution along line IIIB-IIIB of FIG. 3A. Line IIIB-IIIB corresponds to a plane containing the optical axis OAL1 of the first lamp unit 1 and the optical axis OAL2 of the second lamp unit 2 in FIG. 1. In other words, FIG. 3B shows the light quantity distribution along a line intersecting the optical axis of the lamp unit in the opening plane of the lamp unit. In the graph of FIG. 3B, the horizontal axis shows position, and the vertical axis shows brightness. The brightness shown by the vertical axis is the ratio to the brightness of the brightest part. From this graph, it can be seen that the light quantity along line IIIB-IIIB is very small in the vicinity of the optical axis of the lamp unit and is largest in the vicinities of positions at a distance of 2f from the optical axis of the lamp unit. These parts where the light quantity is large will hereinafter be referred to as peaks. As described above, the reason that the light quantity in the vicinity of the optical axis of the lamp unit is small is that the root opening 3B (FIG. 2) of the parabolic mirror 4 for disposing the light emitting tube 3 or the light emitting tube 3 (FIG. 2) itself blocks the emitted light.

Figure 4:
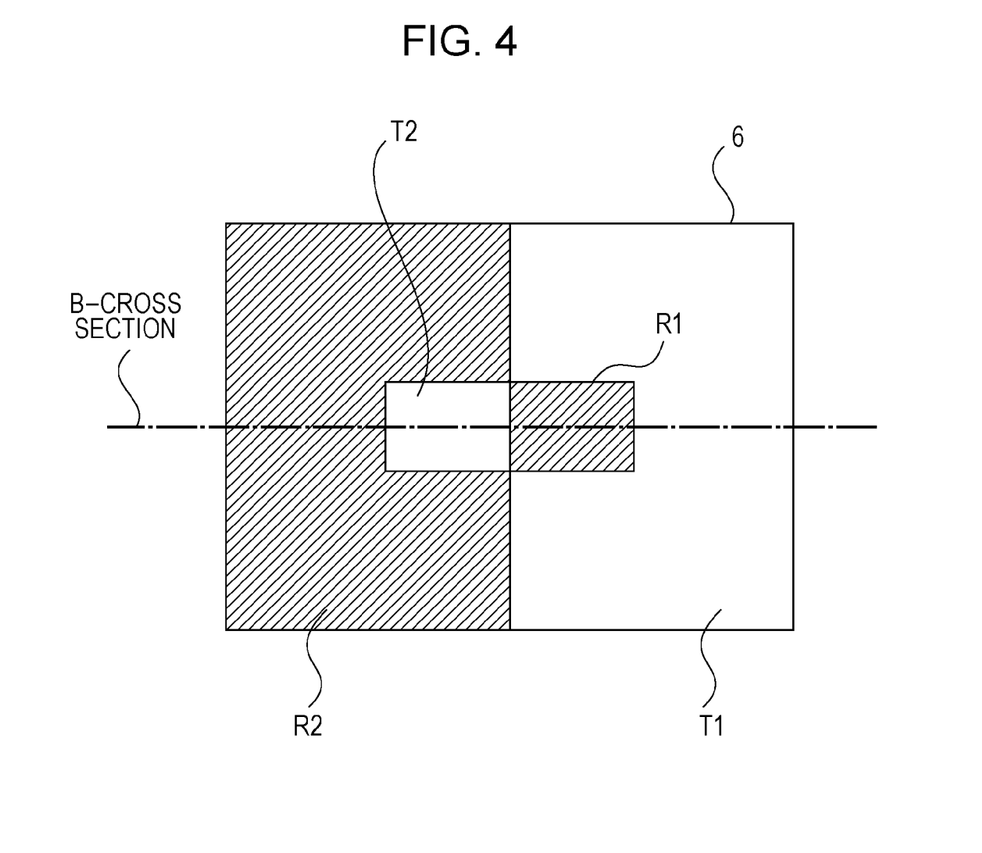
FIG. 4 is a front view of a combining mirror.

Next, the shape of the combining mirror 6 that combines light beams emitted from the lamp units will be described with reference to FIG. 4. FIG. 4 is a front view of the combining mirror 6. FIG. 4 shows the combining mirror 6 as viewed from the direction of arrow IV of FIG. 1. The combining mirror 6 in this embodiment is a glass plate and has reflecting portions and transmitting portions. The hatched portions show the reflecting portions, and the not-hatched portions show the transmitting portions. The alternate long and short dash line (B-cross section) shows a plane containing the optical axis OAL1 of the first lamp unit 1 (FIG. 1) and the optical axis OAL2 of the second lamp unit 2 (FIG. 1). The combining mirror 6 has, in order from one end to the other end (from right to left in the figure) along the B-cross section, a first transmitting portion T1, a first reflecting portion R1, a second transmitting portion T2, and a second reflecting portion R2. The first reflecting portion R1 is located on the optical axis OAL1 of the first lamp unit 1 (FIG. 1). The second transmitting portion T2 is located on the optical axis OAL2 of the second lamp unit 2 (FIG. 1). The shapes of the first transmitting portion T1, the first reflecting portion R1, the second transmitting portion T2, and the second reflecting portion R2 of the combining mirror 6 are not limited to the shapes shown in FIG. 4. The first reflecting portion R1 or the second transmitting portion T2 may be semicircular in accordance with the annular shape of the illuminance distribution of the emitted light. The first reflecting portion R1 and the second transmitting portion T2 do not necessarily have to share a common side and may be separated from each other.

Figure 5:
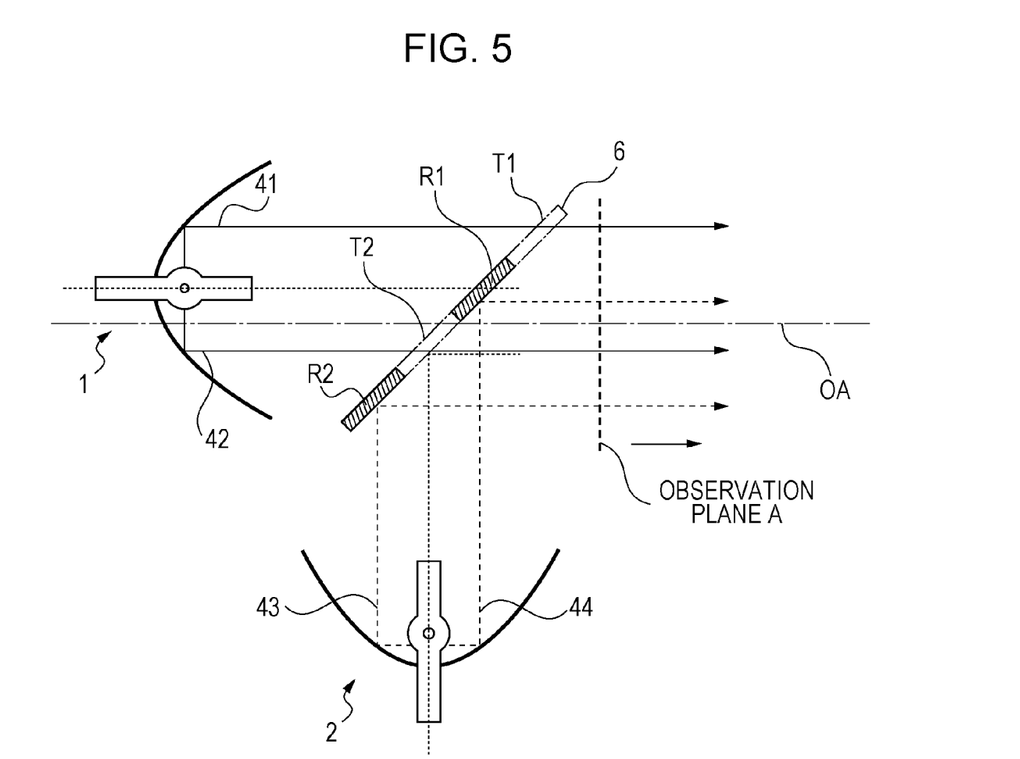
FIG. 5 illustrates the combination by the combining mirror.

The effect of the use of the above-described combining mirror 6 will be described with reference to FIG. 5. The same reference numerals will be used to designate the same components as those already described, so the description thereof will be omitted. The partial reflection glass plate 5 is omitted. For ease of explanation, the combining mirror 6 of FIG. 5 is a sectional view taken along the alternate long and short dash line of FIG. 4. The hatched portions of the combining mirror 6 are reflecting portions, and the portions shown by alternate long and short dash line are transmitting portions. As described above, the combining mirror 6 has, in order from on end to the other end, a first transmitting portion T1, a first reflecting portion R1, a second transmitting portion T2, and a second reflecting portion R2. The solid arrows 41 and 42 show light beams corresponding to the two peaks of the first lamp unit 1. The dashed arrows 43 and 44 show light beams corresponding to the two peaks of the second lamp unit 2.

In terms of the reflecting portions of the combining mirror 6, the first reflecting portion R1 is located on the optical axis of the first lamp unit 1 and off the optical axis of the second lamp unit 2. The second reflecting portion R2 is located off the optical axis of the first lamp unit 1. Light emitted from a region of the second lamp unit 2 off the optical axis is reflected by the first reflecting portion R1 and the second reflecting portion R2 and is combined with light emitted from the first lamp unit 1. In terms of the transmitting portions of the combining mirror 6, the first transmitting portion T1 is located off the optical axis OAL2 of the second lamp unit 2. The second transmitting portion T2 is located on the optical axis OAL2 of the second lamp unit 2 and off the optical axis OAL1 of the first lamp unit 1. In other words, light off the optical axis OAL1 of the first lamp unit 1 is transmitted by the first transmitting portion T1 and second transmitting portion T2 and is combined with light emitted from the second lamp unit 2.

The above-described content will be described on the basis of the light quantity distribution of light emitted from each lamp unit described with reference to FIGS. 3A and 3B. The peaks of light quantity distribution of light emitted from the first lamp unit 1 will be referred to as a first peak 41 and a second peak 42 in order from top to bottom of the figure. The peaks of light quantity distribution of light emitted from the second lamp unit 2 will be referred to as a third peak 43 and a fourth peak 44 in order from left to right of the figure. First, the first transmitting portion T1 of the combining mirror 6 transmits light corresponding to the first peak 41 of the first lamp unit 1. The second transmitting portion T2 located on the optical axis of the second lamp unit 2 transmits light corresponding to the second peak 42 of the first lamp unit 1. Light corresponding to the third peak 43 of the second lamp unit 2 is reflected by the second reflecting portion R2. Light corresponding to the fourth peak 44 of the second lamp unit 2 is reflected by the first reflecting portion R1 located on the optical axis of the first lamp unit 1. That is to say, when viewed from an observation plane A of FIG. 5, light beams from the first peak 41, the fourth peak 44, the second peak 42, and the third peak 43 line up in this order from top to bottom of the figure. The observation plane A is a plane that is located immediately in front of the emitting surface of the combining mirror 6, is perpendicular to a plane containing the optical axis of the first lamp unit 1 and the optical axis of the second lamp unit 2, and is parallel to the liquid crystal display element 12. The first transmitting portion T1 and the second transmitting portion T2 of the combining mirror 6 may be transparent glass plates or openings as long as they transmits light.

Figure 6A:
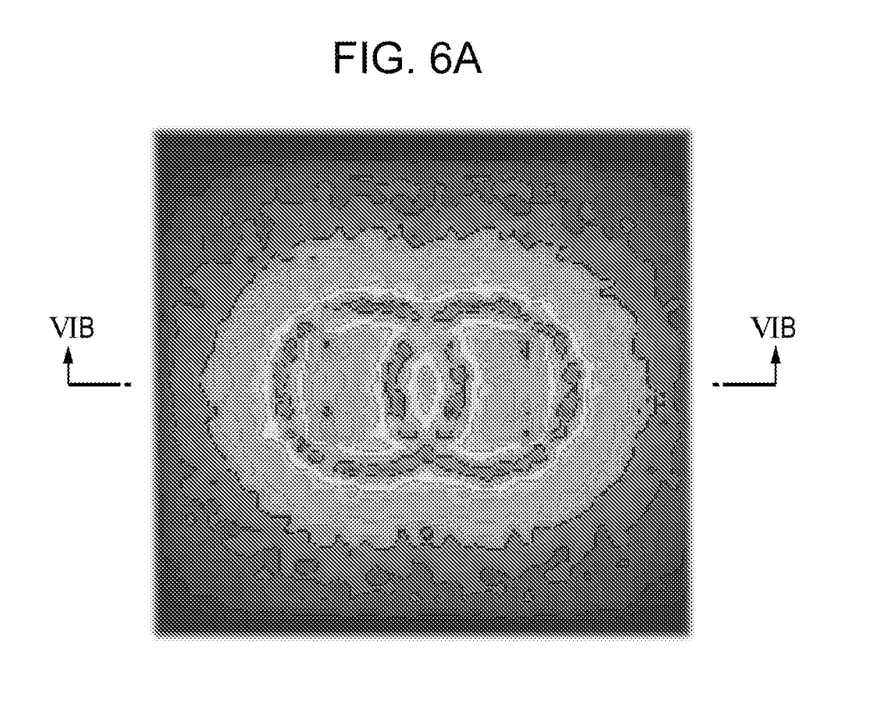
FIGS. 6A to 6F show the intensity distribution of light combined by the combining mirror.
Figure 6B:
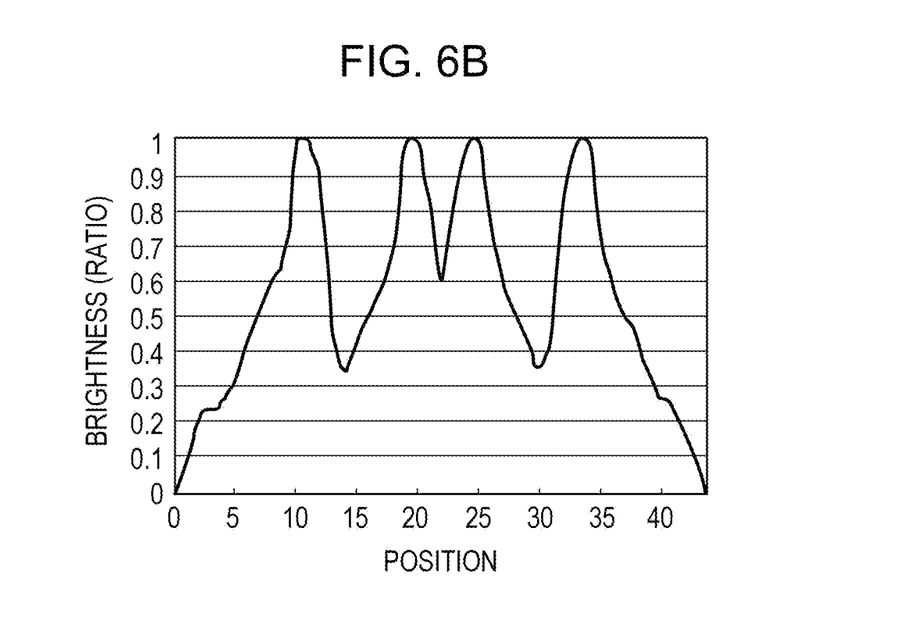

The above-described effect will be described in more detail with reference to FIGS. 6A to 6F. The illuminance distribution of combined light in the observation plane A (FIG. 5) is shown in FIG. 6A. The light quantity distribution along the line VIB-VIB of FIG. 6A is as shown in FIG. 6B. From this, it can be seen that the combining mirror 6 brings bright parts close to the optical axis OA of the illumination optical system with the reflecting portions that take into account the light quantity distribution of light emitted from the lamp units. Line VIB-VIB is a plane containing the axes of the first and second lamp units (FIG. 1).

Figure 6C:
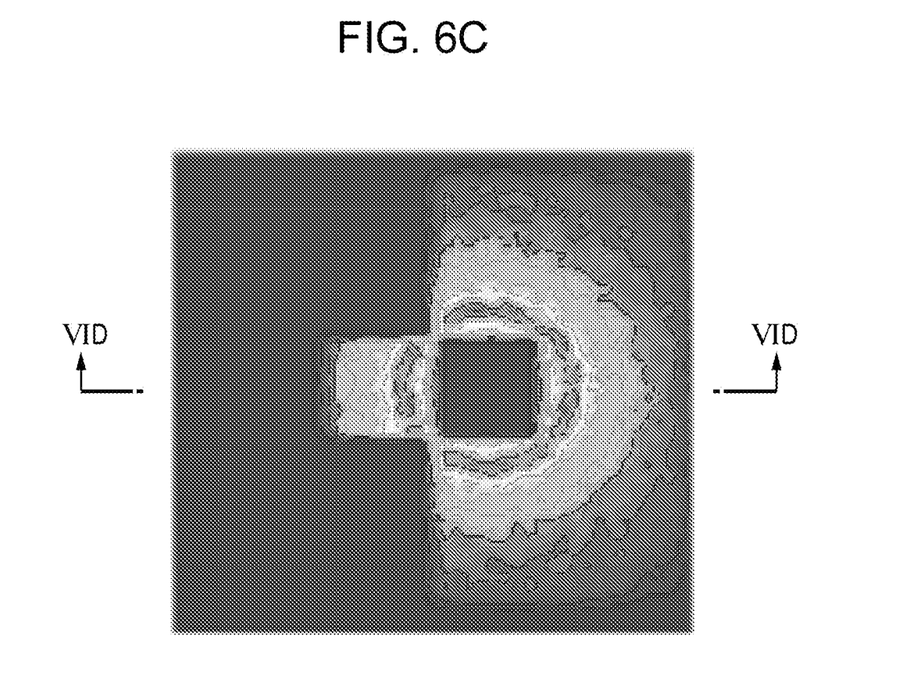
Figure 6D:
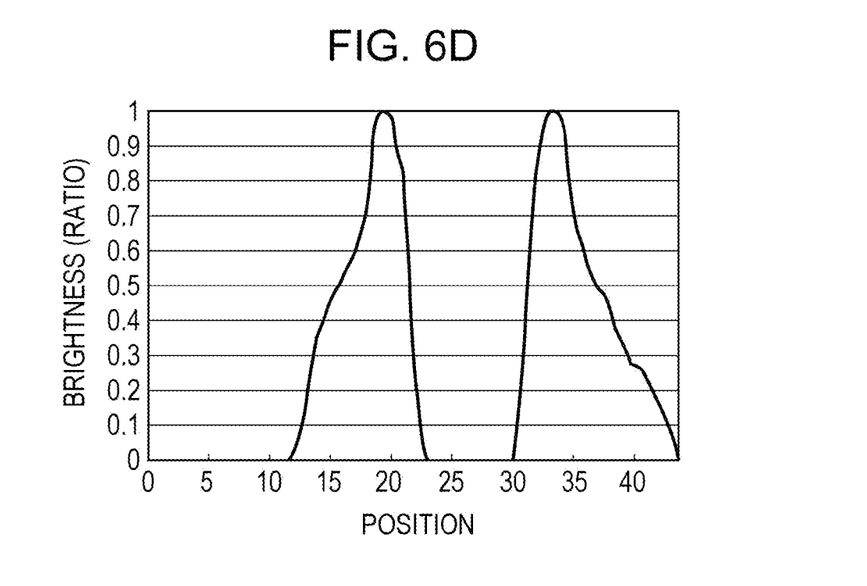
Figure 6E:
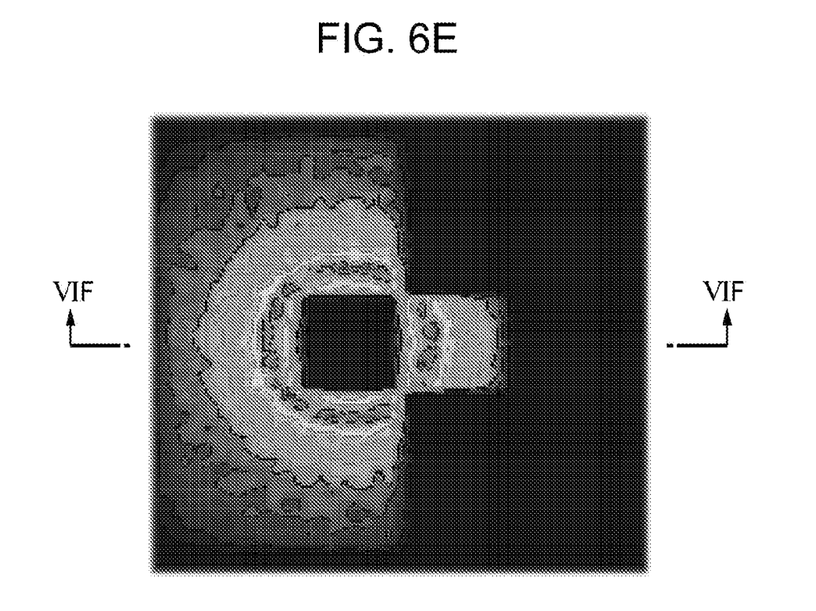
Figure 6F:
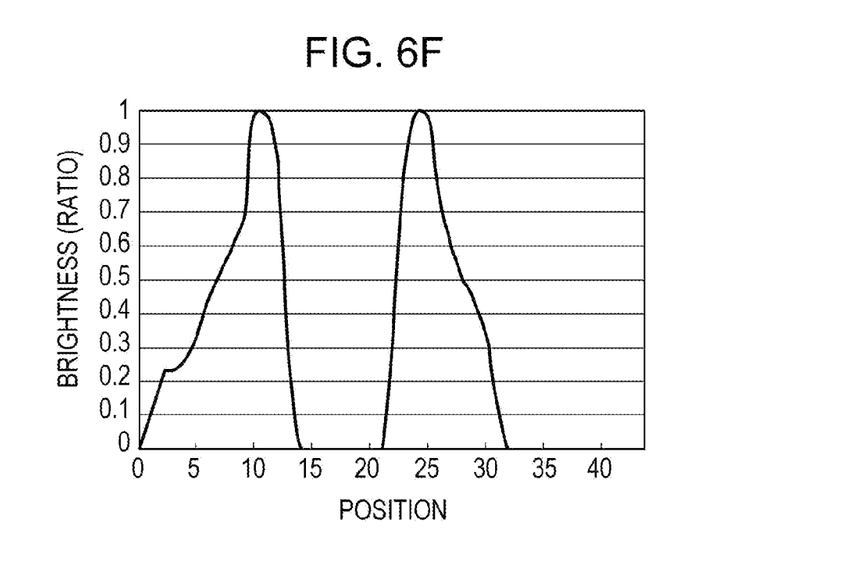

For reference, an image showing the illuminance distribution in the observation plane of light after passing through the combining mirror 6 in the case of illumination only by the first lamp unit 1 is shown in FIG. 6C. The light quantity distribution along line VID-VID of FIG. 6C is shown in FIG. 6D. Similarly, an image showing the illuminance distribution of light after passing through the combining mirror 6 in the case of illumination only by the second lamp unit 2 is shown in FIG. 6E. The light quantity distribution along line VIF-VIF of FIG. 6E is shown in FIG. 6F. From FIGS. 6A to 6F, it can be seen that the reflecting portions appropriately reflect parts where the light quantity is large and combine light beams from the lamp units.

By appropriately disposing the combining mirror 6 having the shape shown in FIG. 4 and the lamp units, combination can be performed such that the bright part off the optical axis of light emitted from each lamp unit is brought close to the optical axis of the illumination optical system. If the bright part is brought close to the optical axis of the illumination optical system, the proportion of light obliquely incident on the liquid crystal display element 12 can be reduced when the combined light is condensed by the condenser lens 10 (FIG. 1) and the liquid crystal display element 12 (FIG. 1) is illuminated. By reducing the proportion of obliquely incident light, the liquid crystal display element 12 as an image modulation element can modulate more light into an appropriate polarization state, and therefore the contrast of the image can be increased.

As described at the beginning, when the concave mirror is a parabolic mirror having a focal length of f, it is desirable that the distance D between the optical axes of the two lamp units satisfy $0<D<4f$. The reason is that when $0<D<4f$, light beams corresponding to the peaks of light emitted from each lamp unit can be superposed. It is more desirable that the distance D satisfy $f \leq D \leq 3f$. In this case, combination can be performed such that a part where the light quantity is large of one of the lamp units is brought to a part where the light quantity is small in the vicinity of the optical axis of the other lamp unit, and therefore the liquid crystal display element or another surface to be illuminated can be uniformly illuminated. In this embodiment, the plane containing the optical axes OAL1 and OAL2 of the lamp units is parallel to a normal to the polarization splitting surface of the polarization beam splitter. However, the plane containing the optical axes of the lamp units does not necessarily have to be parallel to a normal to the polarization splitting surface of the polarization beam splitter.

A method for combining light beams emitted from the lamp units using the combining mirror 6 has been described above. However, when the combining mirror 6 shown in FIG. 5 is used, a part of light emitted from the first lamp unit 1 that is incident on the second reflecting portion R2 is reflected upward in the figure by the second reflecting portion R2 of the combining mirror 6 and is not used as combined light. A part of light emitted from the second lamp unit 2 that is incident on the first transmitting portion T1 passes through the combining mirror 6 upward in the figure and is not used as combined light. To solve this problem, a partial reflection glass plate 5 (light returning portion) is disposed between the first lamp unit 1 and the combining mirror 6. The partial reflection glass plate 5 has reflecting regions that return light not used as combined light.

Figure 7:
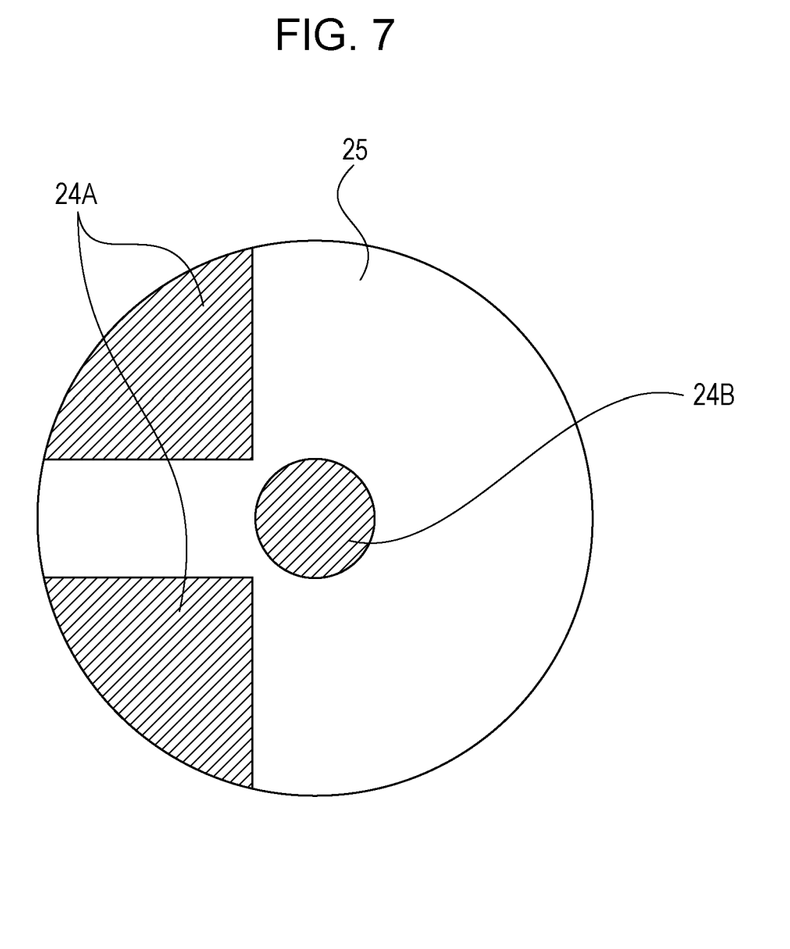
FIG. 7 is a front view of a partial reflection glass plate.

FIG. 7 is a front view of the partial reflection glass plate 5 as viewed from the combining mirror 6. The hatched portions 24A and 24B show reflecting regions, and the not-hatched portion 25 shows a transmitting region. The partial reflection glass plate of this embodiment is a glass plate, and a reflective coating is vapor-deposited on the reflecting regions. The reflecting regions 24A and 24B are formed in portions on which light beams not used as combined light by the combining mirror 6 are incident. The portions on which light beams not used as combined light are incident are, in terms of the first lamp unit 1, when viewed from the observation plane A (FIG. 5), of the region through which light beams emitted from the first lamp unit 1 pass, the portions overlapping with the second reflecting portion R2 (24A in FIG. 7) and the circular region around the optical axis including the optical axis (24B in FIG. 7). They are, in terms of the second lamp unit 2, when viewed from the observation plane B (FIG. 5), of the region through which light beams emitted from the second lamp unit 2 pass, the portions overlapping with the first transmitting portion T1 and the circular region around the optical axis including the optical axis. Because the partial reflection glass plate has a reflecting region in a region (24B) around the optical axis, a small quantity of light emitted from the light source can be returned to the light source, and the quantity of light increases. The partial reflection glass plate 5 is disposed such that the center of the partial reflection glass plate 5 coincides with the optical axis of the lamp unit. The partial reflection glass plate 5 does not necessarily have to be circular.

Figure 8:
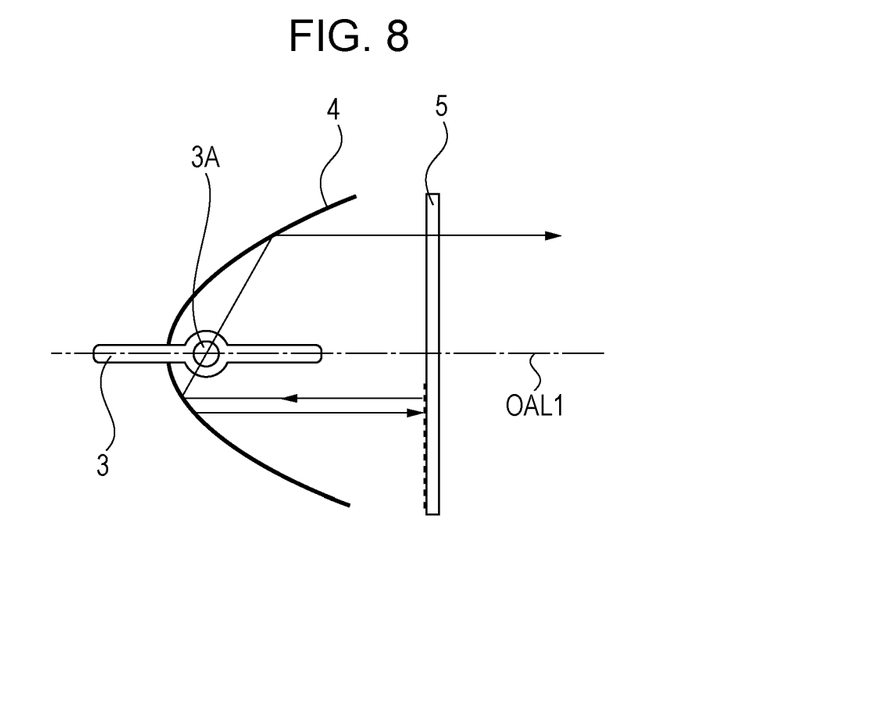
FIG. 8 illustrates the optical path of the lamp unit when the partial reflection glass plate is used.

FIG. 8 illustrates the effect of the partial reflection glass plate 5. Light emitted from the light source portion 3A is reflected in the vicinity of the optical axis, then becomes substantially parallel light, and is incident on the partial reflection glass plate 5. Because the reflecting regions shown in FIG. 7 are provided on the incidence surface of the partial reflection glass plate 5, light incident on the regions is reflected in the incident direction, is reflected by the parabolic mirror again, and is returned to the light source. The light returned to the light source is emitted toward the periphery of the parabolic mirror. The light is then reflected by the periphery of the parabolic mirror 4, becomes substantially parallel light, and is emitted. The emitted light passes through the transmitting region and is incident on the combining mirror 6. In other words, the partial reflection glass plate 5 (light returning portion) is disposed between the combining mirror 6 (light combining portion) and each lamp unit and divides a part of light emitted from the lamp unit into a light beam to be returned to the lamp and a light beam to be led to the combining mirror. That is to say, the partial reflection glass plate 5 having the reflecting regions shown in FIG. 7 is disposed between the opening plane of the parabolic mirror 4 and the combining mirror. This can return light that is emitted from the lamp but is not led to the liquid crystal display element by the combining mirror 6 (light not used as combined light) to the light source, and therefore light use efficiency can be improved.

In the present invention, in order to return light, in consideration of the shape of the combining mirror 6, a reflective coating is vapor-deposited on the central part and parts in the diagonal direction of the partial reflection glass plate 5 (FIG. 7). Thus, light beams emitted from the two lamp units can be combined with the loss in the combining mirror 6 minimized, therefore the light quantity loss can be reduced, and the surface to be illuminated can be illuminated more brightly. In this embodiment, the partial reflection glass plate 5 is provided integrally with the lamp unit. The reason is that the light use efficiency is higher when a reflective coating for returning light is provided at a position near the lamp unit than when a light returning portion is provided at a position distant from the lamp unit. Specifically, it is desirable that the distance L (mm) from the opening plane of the lamp unit satisfy 0<L<25. The reason is as follows.

Figure 9:
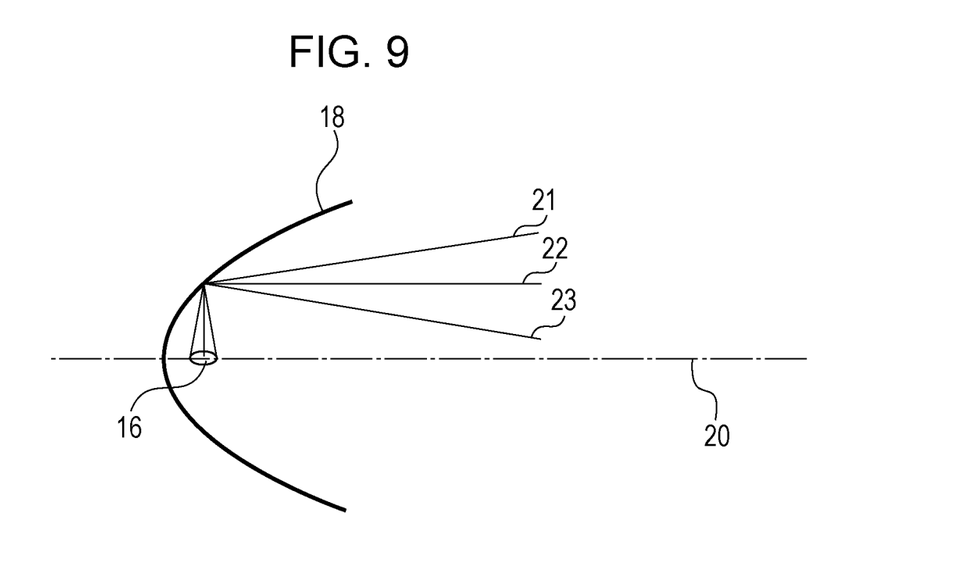
FIG. 9 shows light rays emitted from a light source having a finite size.

FIG. 9 shows light rays emitted from the light emitting portion. If the light source is an ideal point light source, light rays emitted from the light source are reflected and made parallel by the concave mirror (parabolic mirror). However, actually, the light emitting portion 16 emits light between two opposite electrodes in the light emitting tube and therefore has a finite size. The light emitting portion 16 has a predetermined length in the direction of the optical axis 20 of the parabolic mirror 18. Therefore, a light ray 23 emitted from a point at the front end of the light emitting portion and reflected by the parabolic mirror 18 is reflected toward the optical axis. A light ray 21 emitted from a point at the back end of the light emitting portion is reflected by the parabolic mirror 18 away from the optical axis 20. Therefore, with increasing distance from the opening plane of the lamp, light diverges, the boundary between the central dark part and the annular bright part becomes blurred, and the light quantity loss increases in a technique using the combining mirror 6. By disposing the partial reflection glass plate 5 as close to the lamp unit as possible, emitted light can be efficiently returned.

The reflecting member of the first embodiment is a partial reflection glass plate 5 formed by vapor-depositing a reflective coating on a transparent glass plate. However, the present invention is not limited to this. A returning mirror may be formed by making a hole (opening) serving as a transmitting portion in a reflecting member. Both the first and second lamp units may be provided with a partial reflection mirror. Even if only one of the first and second lamp units is provided with a partial reflection mirror, the quantity of light usable for illumination increases.

Figure 10:
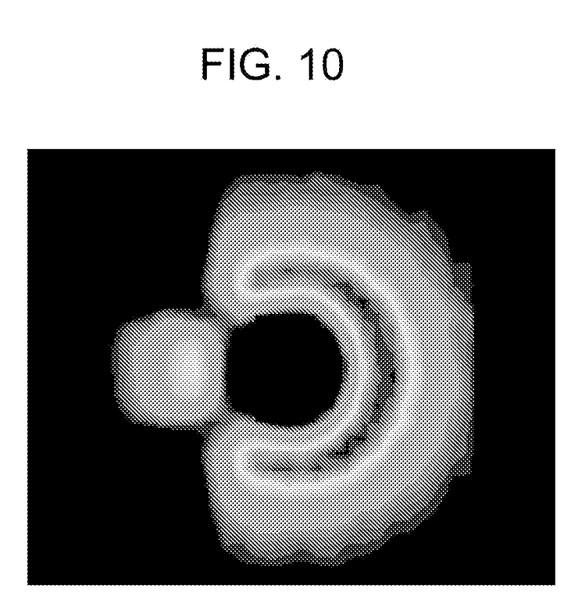
FIG. 10 shows the illuminance distribution when the partial reflection glass plate is used.

The light quantity was about 10% larger in the case of a glass plate on which reflecting regions are vapor-deposited than in the case of a glass plate on which reflecting regions are not vapor-deposited. FIG. 10 is an image when the partial reflection glass plate 5 is used and when effective light beams relating to the combining mirror 6 are traced back to the partial reflection glass plate 5. It can be seen that the luminance is higher than that of FIG. 6C.

Second Embodiment

Figure 11:
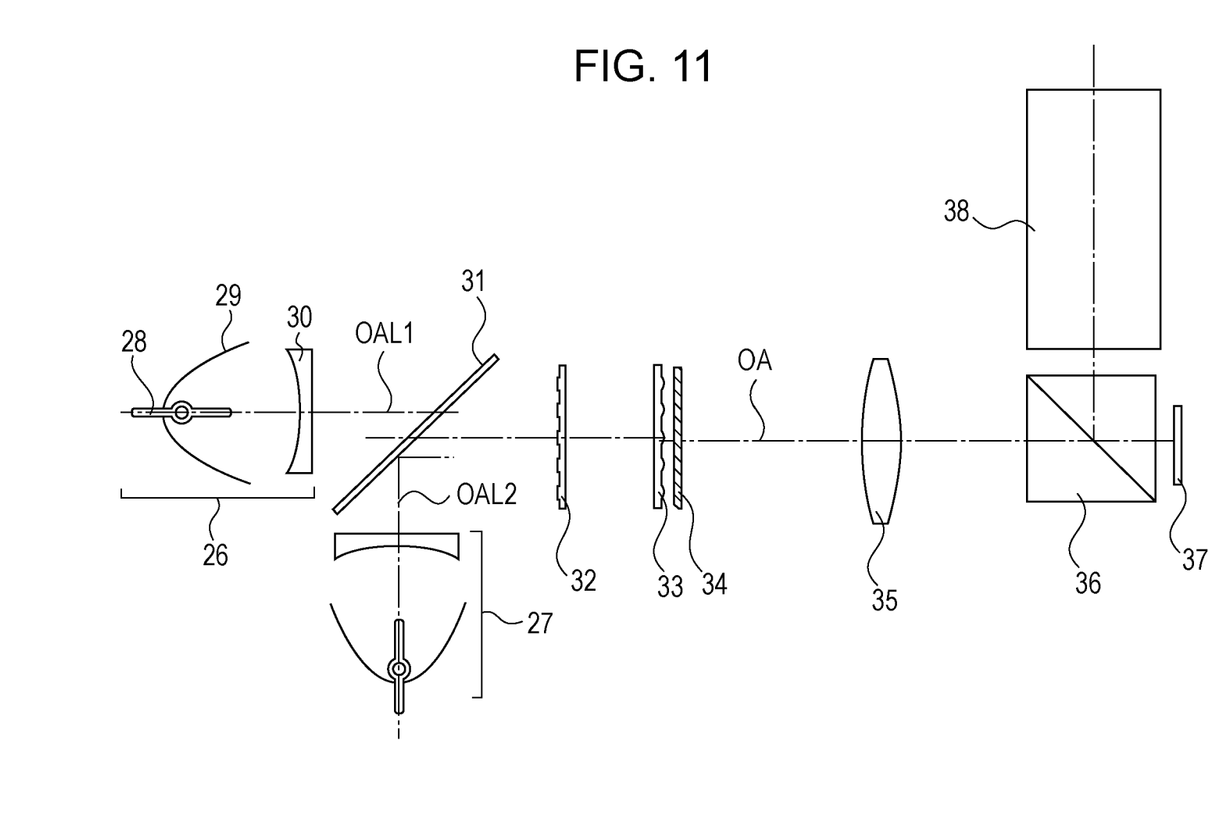
FIG. 11 is a schematic configuration diagram of a second embodiment.

FIG. 11 is a configuration diagram of a second embodiment of the present invention. The components other than lamp units are the same as those in the first embodiment, so the description thereof will be omitted. Reference numeral 26 denotes a first lamp unit, and reference numeral 27 denotes a second lamp unit. The first lamp unit 26 includes a light emitting tube 28, an elliptic mirror 29 (concave mirror), and a concave lens 30 having a reflective coating (returning mirror) vapor-deposited on the plane surface thereof. The second lamp unit 27 has the same configuration as the first lamp unit 26. By combining the elliptic mirror 29 and the concave lens 30, substantially parallel light is emitted from the concave lens 30.

Figure 12:
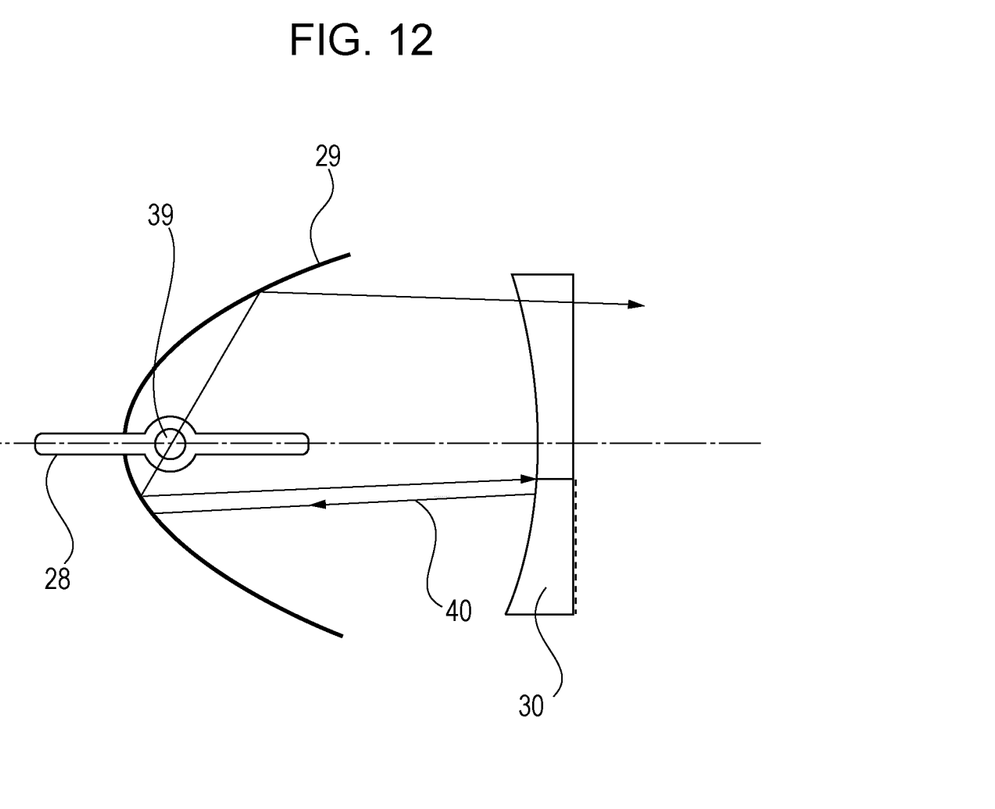
FIG. 12 illustrates the optical path of a lamp unit of the second embodiment.

FIG. 12 is an enlarged view of the first lamp unit 26. The front view of the reflecting regions as viewed from the exit surface of the concave lens 30 is the same as FIG. 7. The hatched portions 24 show the reflecting regions, and the not-hatched portion 25 shows the transmitting region. The same reflective coating as that shown in FIG. 7 is vapor-deposited on the plane surface of the concave lens 30 except for the transmitting region. Thus, the concave lens 30 serves as a light returning portion. As shown in FIG. 12, light 40 near the optical axis emitted from the lamp is returned to the light emitting portion 39 by the reflective coating vapor-deposited on predetermined regions of the plane surface of the concave lens 30 and is then reflected by the periphery of the elliptic mirror 29. Return light (light that is reflected by the reflecting regions of the concave lens and is then reflected by the reflector again) is incident on the effective region of the combining mirror 31, and therefore the light quantity loss is very small. In other words, reflecting regions are provided out of the effective range of the combining mirror 31, and light that is not led to the liquid crystal display element by the combining mirror 31 is returned to the lamp. This makes it possible to make full use of light beams emitted from the two lamp units and to perform brighter illumination.

In both the first and second embodiments, the light returning portion (the partial reflection glass plate 5, the concave lens 30) is integral with the lamp unit. However, the light returning portion does not necessarily have to be integral with the lamp unit. Although a fly eye lens is used as an integrator, the present invention can also be applied to an illumination optical system using a rod integrator. In that case, light combined by the combining mirror is condensed and caused to be incident on the rod integrator. The quantity of usable light can also be increased when the present invention is applied to the illumination of an apparatus that uses, as substitute for a liquid crystal display element, a micro mirror device as an image modulation element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-288813 filed Dec. 21, 2009, which is hereby incorporated by reference herein in its entirety.

What is claimed is:

1. An illumination optical system comprising:
   first and second lamp units each including a lamp and a concave mirror, the lamp having an anode and a cathode arranged along the optical axis of the concave mirror;
   a light combining portion that combines a light beam from the first lamp unit and a light beam from the second lamp unit, the light combining portion including a first reflecting portion located on the optical axis of the first lamp unit and off the optical axis of the second lamp unit and a second reflecting portion located off the optical axis of the first lamp unit, the light combining portion combining the light beams by reflecting light emitted from a part of the second lamp unit off the optical axis of the second lamp unit with the first and second reflecting portions;
   at least one light returning portion disposed between the first lamp unit and the light combining portion, or between the second lamp unit and the light combining portion, or both, the or each of the at least one light returning portion dividing a part of light emitted from the corresponding lamp unit into a light beam to be returned to the lamp and a light beam to be led to the light combining portion; and
   a condenser lens that condenses light from the light combining portion,
   wherein when, in a cross-section containing the optical axes of the first and second lamp units, two peaks of light quantity distribution along a line intersecting the optical axis of the first lamp unit in the opening plane of the first lamp unit are referred to as first and second peaks, and two peaks of light quantity distribution along a line intersecting the optical axis of the second lamp unit in the opening plane of the second lamp unit are referred to as third and fourth peak, the light combining portion has in order from one end to the other end:
   a first transmitting portion transmitting light corresponding to the first peak;
   the first reflecting portion located on the optical axis of the first lamp unit and reflecting light corresponding to the fourth peak;
   second transmitting portion located on the optical axis of the second lamp unit and transmitting light corresponding to the second peak; and
   the second reflecting portion reflecting light corresponding to the third peak, and
   wherein the at least one light returning portion includes a first light returning portion disposed between the first lamp unit and the second reflecting portion and a second light returning portion disposed between the second lamp unit and the first transmitting portion.

2. The illumination optical system according to claim 1, wherein the light combining portion combines light emitted from the second lamp unit and reflected by the first reflecting portion and the second reflecting portion and light emitted from the first lamp unit and passing through between the first reflecting portion and the second reflecting portion.

3. The illumination optical system according to claim 1, wherein the light returning portions each have a reflecting region, on which a reflective coating is vapor-deposited.

4. The illumination optical system according to claim 1, wherein a reflecting region of the first light returning portion reflects, of the light emitted from the first lamp unit, light beams incident on the first and second reflecting portions.

5. The illumination optical system according to claim 1, wherein the concave mirror is a parabolic mirror, and each light returning portion is formed on a glass plate.

6. The illumination optical system according to claim 1, wherein the concave mirror is an elliptic minor, and each light returning portion is formed on a concave lens.

7. The illumination optical system according to claim 6, wherein one side of the concave lens is plane, and a reflecting region is formed on the plane side.

8. The illumination optical system according to claim 1,
   wherein the illumination optical system illuminates an image modulation element with light condensed by the condenser lens, and
   wherein the illumination optical system has a polarization beam splitter between the condenser lens and the image modulation element.

9. A projection display apparatus comprising:
   an image modulation element;
   illumination optical system according to claim 1 that illuminates the image modulation element; and
   a projection optical system that projects light from the illumination optical system.

10. The illumination optical system according to claim 1, further comprising:
    a rod or a lens array constituting the integrator with the condenser lens, the integrator being configured to integrate the light beam from the light source on the image display element,
    wherein the light combiner is located between the first lamp unit and the rod or the lens array.

* * * * *